United States Patent [19]

Foster et al.

[11] Patent Number: 5,607,323

[45] Date of Patent: Mar. 4, 1997

[54] SNAP ADAPTER

[75] Inventors: Nigel S. Foster, Southampton; David P. Murray, Winchester, both of England

[73] Assignee: ITT Corporation, New York, N.Y.

[21] Appl. No.: 358,497

[22] Filed: Dec. 19, 1994

[51] Int. Cl.[6] .................................................. H01R 13/73
[52] U.S. Cl. .................... 439/557; 174/153 G; 174/65 R
[58] Field of Search ................................ 174/153 G, 65, 174/5; 439/553, 557

[56] References Cited

U.S. PATENT DOCUMENTS

| 2,110,959 | 3/1938 | Lombard | 85/5 |
|---|---|---|---|
| 2,687,862 | 8/1954 | Crowther | 248/27 |
| 2,762,989 | 9/1956 | Johnson | 439/557 |
| 2,790,961 | 4/1957 | Del Camp | 339/128 |
| 2,823,932 | 2/1958 | Schigut | 285/162 |
| 2,950,458 | 8/1960 | Artz | 339/217 |
| 3,116,098 | 12/1963 | Kulka | 439/557 |
| 3,193,613 | 7/1965 | Van Buren, Jr. | 174/65 |
| 3,355,701 | 11/1967 | Biba | 339/126 |
| 3,562,847 | 3/1969 | Jemison | 174/153 G |
| 4,585,295 | 4/1986 | Ackerman | 339/258 |

Primary Examiner—Neil Abrams
Assistant Examiner—Eugene Byrd
Attorney, Agent, or Firm—Thomas L. Peterson

[57] ABSTRACT

An adapter (12, FIG. 1) is described, for mounting a passthrough on a panel (14) to hold by a wire cable or optical cable, wherein the adapter can be installed by merely pushing it rearwardly into a hole (20) in the panel. The adapter includes a tubular passthrough (16) and a molded plastic clip (18) that is mounted on the passthrough. The clip has a front end (40, FIG. 3) that forms a large washer to abut the front face of the panel, and has a sleeve (46) extending rearwardly from the washer with a rear sleeve end (50) that closely surrounds the passthrough. The sleeve has a pair of U-shaped slits (56, 64, FIG. 2), with the base of each U-slit lying most forward, to leave a latch (62, 66) having a rear latch end merging with the rest of the sleeve and a free front latch end (124, FIG. 3) which can abut the rear face of the panel. The passthrough has a recessed portion (76) into which the latches are deflected when the adapter is inserted rearwardly through the hole in the panel. The front ends of the latches have steps forming abutment surfaces (80–84) for abutting the rear of the panel, including a first abutment surface (80) lying furthest forward and radially innermost, and a second abutment surface (82) lying a small distance rearward and radially outward of the first one.

5 Claims, 3 Drawing Sheets

SNAP ADAPTER

BACKGROUND OF THE INVENTION

Passthrough adapters are mounted in holes of panels to provide passageways through which electric or optical cables can pass, or at which connections can be made. A common type of adapter includes a tube that is inserted into a hole in the panel, the tube having a flange which abuts the front face of the panel and having a thread. The thread receives a nut that presses a washer against the rear face of the panel. In many panel applications, there is very little room around the adapter for applying a wrench to the nut to tighten it. If an adapter could be installed without requiring a wrench or other tool to lie closely around it, especially if the adapter could be installed by merely pushing it into the hole until it snapped into place, this would provide a more easily used adapter. The adapter should be of low cost and able to securely mount in panels of a range of thicknesses.

SUMMARY OF THE INVENTION

In accordance with one embodiment of the present invention, applicant provides an adapter for mounting in a panel hole, which can be constructed at low cost and which can be easily installed. The adapter includes an elongated passthrough and a molded plastic clip which is mounted on the passthrough and which holds the passthrough in the panel hole. The clip has a front end with a washer to abut the front face of the panel, and has a sleeve extending through and rearward of the panel. The sleeve has at least one largely U-shaped slit, with the base of the slit lying most forward, to leave a latch having a rear latch end merging with the rest of the sleeve and a free front latch end lying slightly rearward of the washer and abutting the rear face of the panel.

The washer has a concave rear face, to allow the washer to provide spring bias that biases the latches forwardly against the panel rear face. The passthrough has an annular groove and the clip has an inward flange that projects radially inwardly into the groove to hold the clip onto the passthrough. The passthrough has a recess into which latches can be radially inwardly deflected, during insertion of the adapter rearwardly through a hole in the panel. Each latch preferably has a stepped forward end, with a first abutment surface for abutting thin panels and with a second abutment surface lying rearward and radially outward of the first abutment surface, for abutting the rear face of a thicker panel.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
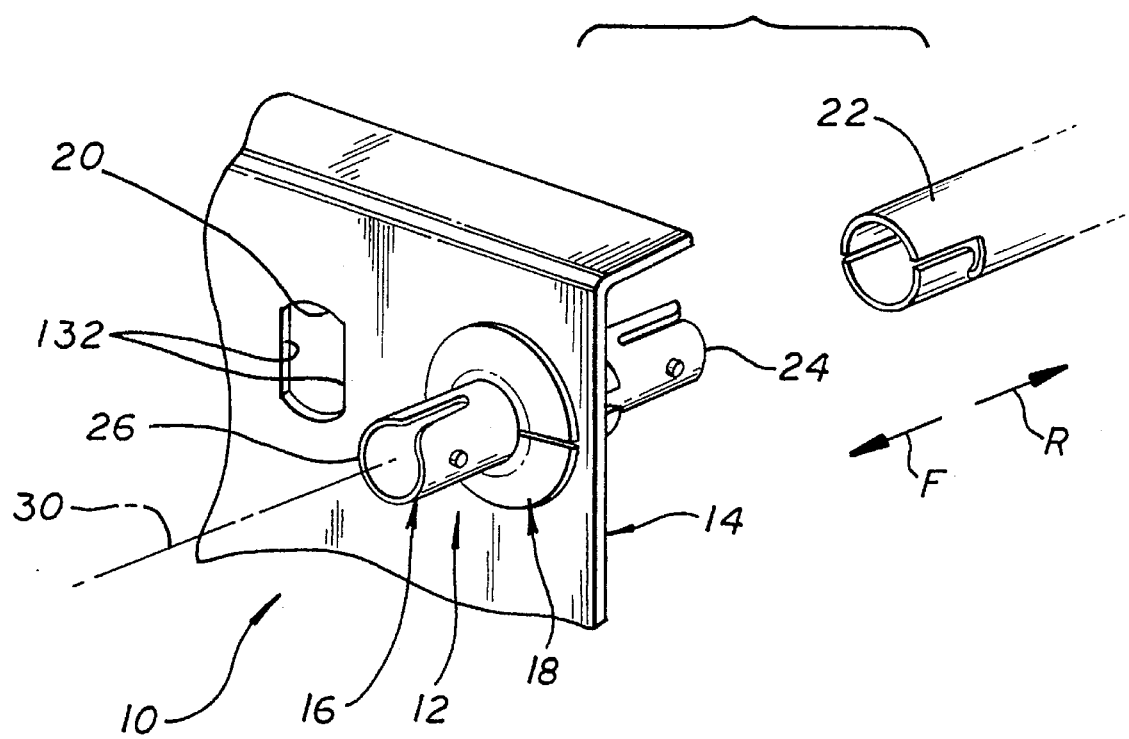
FIG. 1 is a front isometric view of an adapter mounted on a panel, and showing a connector that can be mated to one end of the adapter.

FIG. 1 illustrates an assembly 10 of an adapter 12 on a panel 14. The adapter includes a passthrough 16 and a clip 18. The adapter passes through a hole in the panel, with another identical panel hole being shown at 20. The figure also shows a connector 22 which can be mated to a rear end 24 of the adapter passthrough, with the passthrough having a similar front end 26. The panel is formed by punching holes such as 20 in it. An adapter 12 is installed by moving it in a rearward direction R into a panel hole, along an axis 30 of the hole and adapter, an arrow F indicating the opposite forward direction.

Figure 2:
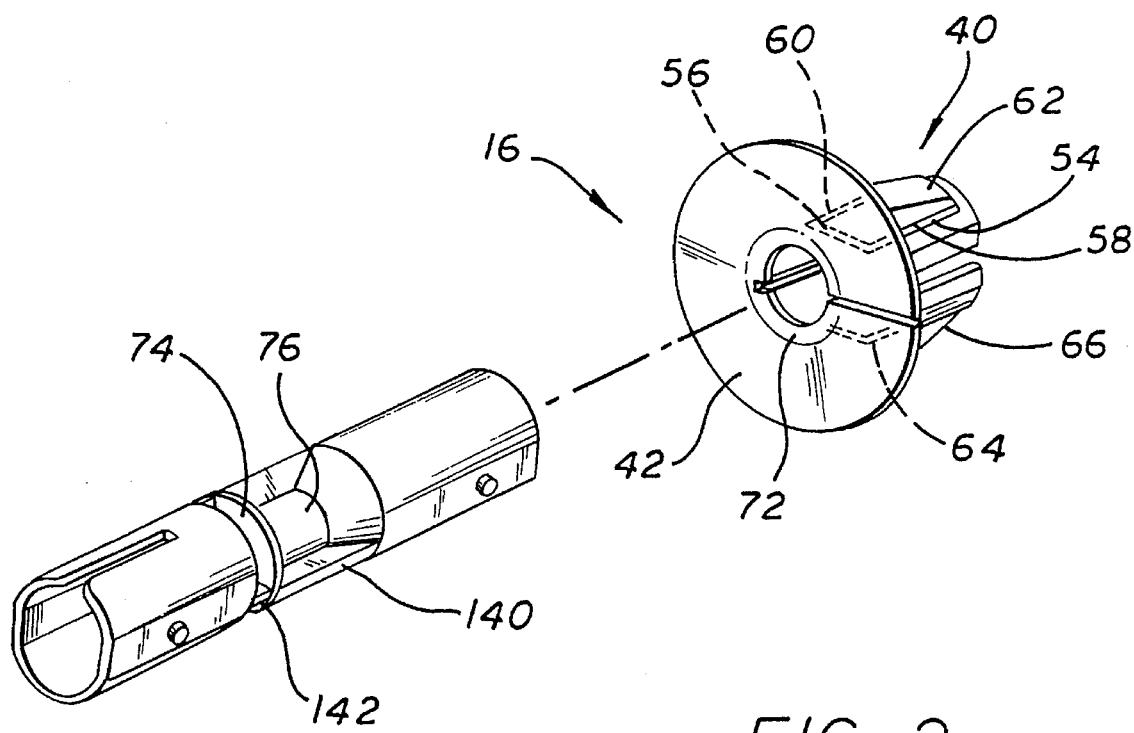
FIG. 2 is an exploded isometric view of the adapter of FIG. 1, showing the passthrough and the clip.
Figure 3:
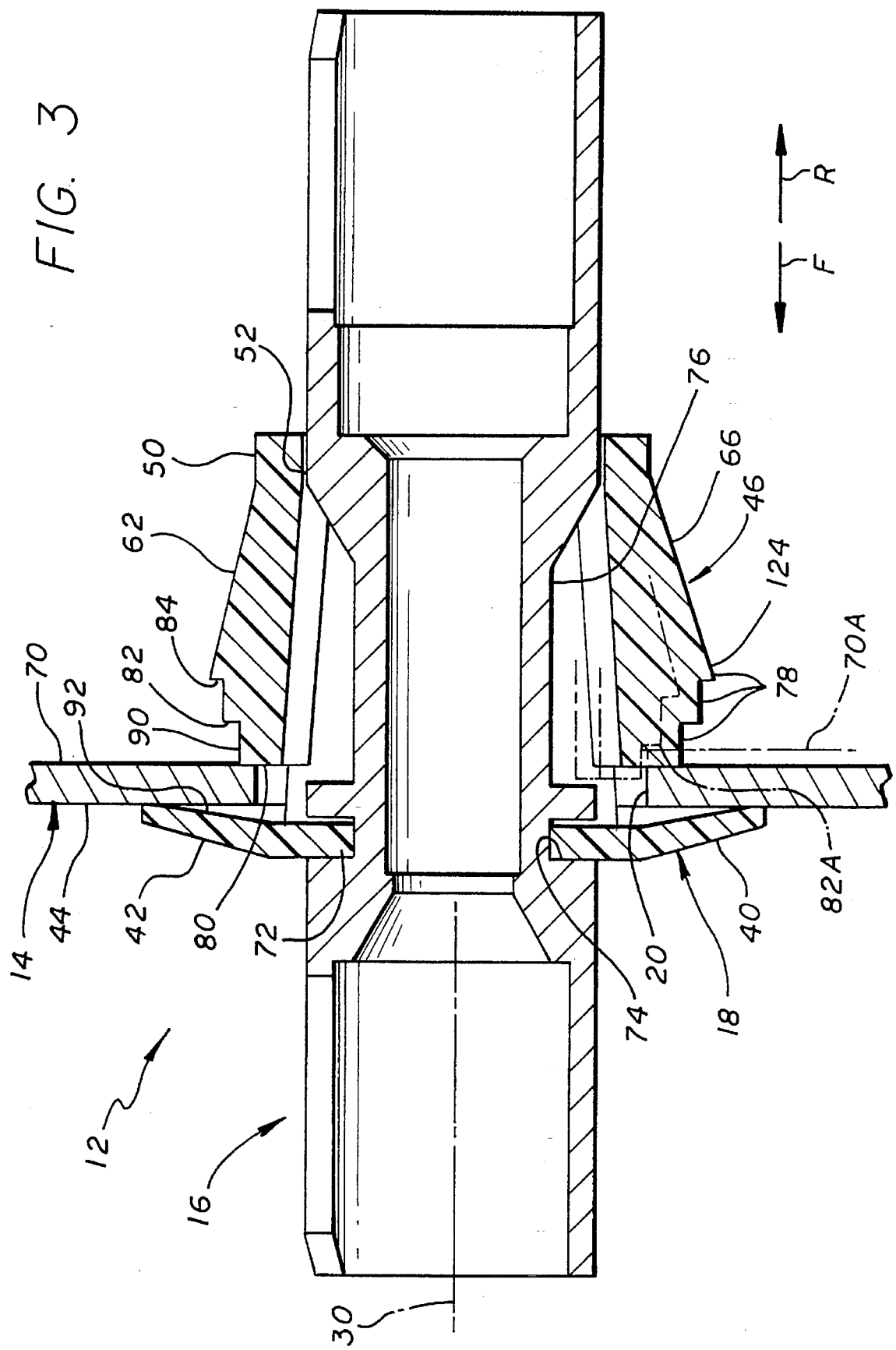
FIG. 3 is a sectional view of the adapter and panel of FIG. 1.

As shown in FIG. 3, the clip 18 has a front end 40 with a radially outwardly projecting flange 42 that forms a washer that substantially abuts the front face 44 of the panel. The clip also includes a sleeve 46 extending rearwardly from the washer and having a rear end 50 that closely surrounds a location 52 on the passthrough. As indicated in FIG. 2, the sleeve has at least one U-shaped slit 54 with the base 56 of the slit lying most forward, and with sides 58, 60 of the slit extending rearwardly from the base. The slit 50 leaves a latch 62. Actually, the sleeve has two slits 54, 64 that leave two latches 62, 66. FIG. 3 shows the latches 62, 66 abutting the rear face 70 of the panel.

The clip has an inward flange 72 that is received in an annular groove 74 of the passthrough, to serve as a mount to hold the clip on the passthrough. The passthrough has a recessed portion 76 lying rearward of the groove and radially within the latches 62, 66. The adapter 12 is installed by moving it in the rearward direction R through the panel hole 20, and during such movement the latches 62, 66 are radially inwardly depressed into the recessed portion 76. After the latches pass rearwardly of the panel, they spring out to the positions shown.

Each latch has a plurality of steps 78 with forwardly-facing abutment surfaces 80, 82, and 84. The second surface 82 lies rearward and radially outward of the first surface 80, while the third surface 84 lies rearward and radially outward of the second surface 82. For a relatively thin panel shown in FIG. 3, the abutment surface 80 will pass the panel rear face 70 and will spring to the position shown. FIG. 3 also shows, in phantom lines at 70A, the rear face of a thicker panel. In that case, when the adapter is fully inserted into the hole, the second abutment surface at 82A will abut the panel rear face. In that case, a radially outward surface 90 will lie in the flange hole 20. For a panel of still greater thickness, the third abutment surface 84 will abut the panel rear face. Of course, the thickness of the panel includes any coating that may be applied to its faces.

It is desirable that the adapter lie in a fixed position in the panel and not "rattle" around in it. To this end, the flange 42 which forms a washer, is formed with a concave rear face 92. This allows the washer to serve as a spring that biases the latches 62, 66 in a forward direction F while allowing them to be deflected rearwardly. The result is that an abutment surface such as 80 will tend to press firmly against the panel rear face.

Figure 4:
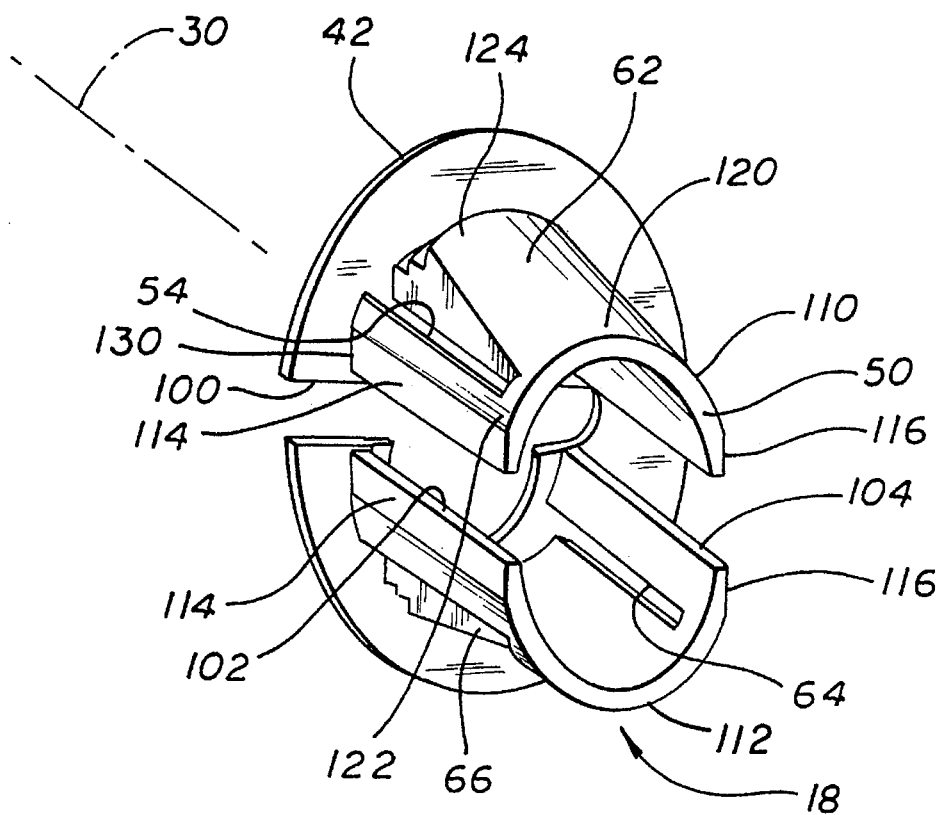
FIG. 4 is a rear isometric view of the clip of FIG. 2.
Figure 5:
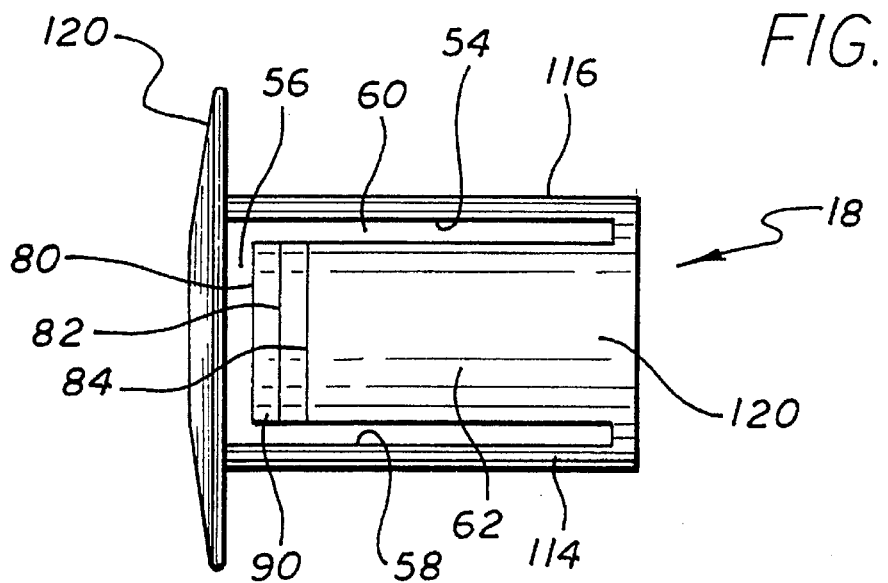
FIG. 5 is a plan view of the clip of FIG. 4.

As shown in FIG. 4, the clip 18 has a radially-extending slot 100 and an axially extending slot 102. The slots 100, 102 permit the clip to "open" to enable it to be mounted on the passthrough (by the inward flange 72 being received in the passthrough groove). Applicant prefers to provide a second slot 104 on a radially opposite side of the sleeve, which results in a pair of sleeve parts 110, 112 that are separated by the slots 102, 104. This allows the rear end 50 of the sleeve to bear against the passthrough, and allows the latches to lie symmetrically on opposite sides of the adapter and clip axis 30. For each sleeve part such as the upper one 110, the sleeve part has a pair of legs 114, 116 extending rearwardly from the washer 42, with the latches 62, 66 having rear ends 120 mounted on rear ends 122 of the legs, and with the latches having front ends 124 lying rearward of the washer and being resiliently biased to a position far enough from the axis to abut the rear face of the panel.

It may be noted that the portion of the sleeve which lies in the panel hole is rounded, except at flat parts 130. The flat parts 130 can abut flat sides of a panel hole. As shown in FIG. 1, the panel hole 20 is round, except for flat sides at 132. Since the sleeve tends to expand, the provision of flat sides at 130 causes these flat sides to abut the panel hole flat sides 132 and resist turning of the adapter within the panel. It may be noted in FIG. 2, that applicant prefers to construct the passthrough with webs 140, 142 on diametrically opposite sides of the recessed portion 76 and of the annular groove 74 to strengthen the narrow middle of the passthrough.

The passthrough 16 illustrated is formed of metal, although where allowable, it can be formed of molded plastic. The clip 18 is a molded plastic part. It would be possible to form the clip with a single latch, or with three or more latches of the construction shown, although applicant prefers two latches to provide symmetry, with each latch outer surface 90 preferably being curved to provide a large area where an abutment surface such as 80 presses against the rear face 70 of the panel.

Thus, the invention provides an adapter which can be easily installed on a panel or other plate without a wrench or the like and which holds securely in place, in a relatively low cost construction. The adapter includes a passthrough that extends substantially through the panel hole and a molded plastic clip which holds the passthrough in position. The clip includes a washer that substantially abuts the front face of the panel and a sleeve extending through and rearwardly of the panel hole and that forms at least one and preferably two latches with free front ends forming abutment surfaces to abut the rear face of the panel. The latches can be formed by largely U-shaped slits in the sleeve. The washer preferably has a concave face and is deflectable, so the washer provides a forward spring bias. The latches have front ends with steps forming a plurality of abutment surfaces to abut panels of a range of thicknesses. At least one side of the sleeve can be flattened to prevent turning in a panel hole that has a flat side. The passthrough preferably has a recess which receives the front ends of the latches during their rearward movement through the panel hole.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. An adapter for mounting in a hole of a panel that has front and rear faces, comprising:

a passthrough which has an axis and which is elongated in an axial direction;

a clip which is centered on said axis and mounted on said passthrough, said clip having a front end with a radially outwardly projecting flange which forms a washer to substantially abut said front face of said panel, and said clip having a sleeve extending rearwardly from said washer and forming at least one latch with a front end lying slightly rearward of said washer for abutting said rear face;

said passthrough has an annular groove extending about said axis, and said front end of said clip has a radially inwardly projecting flange which projects into said groove of said passthrough to mount said clip on said passthrough.

2. An adaptor for mounting in a hole of a panel that has front and rear faces, comprising:

a passthrough which has an axis and which is elongated in an axial direction to lie in the hole in the panel;

a clip which is mounted on said passthrough, said clip having a front end with a radially outwardly projecting flange which forms a washer to abut said front face of said panel;

said clip including a sleeve extending rearwardly from said washer and having at least one latch with a front end that forms a directly forwardly facing abutment surface lying rearward of said washer for abutting said panel rear face;

said washer having a concave rear face that can abut said panel and that can be deflected rearwardly to resiliently urge said sleeve forwardly and cause said forwardly-facing abutment surface on the latch front end to press against said panel rear face.

3. An adaptor for mounting on a panel which has front and rear faces and a through hole, where said adapter includes a passthrough for extending substantially through said hole and a clip for holding said passthrough to said panel, characterized by:

said passthrough has a groove;

said clip has an axis, a radially inwardly projecting flange which lies in said groove, a washer extending around said axis for abutting said panel front face, a plurality of legs extending rearwardly from said washer and having rear ends for lying rearward of said panel rear face, and a plurality of latches having rear ends mounted on said rear ends of said legs and having front ends lying slightly rearward of said washer and being resiliently biased to a position far enough from said axis to abut said panel rear face but being resiliently deflectable toward said axis to enable said latches to pass through said hole when said passthrough with said clip thereon is pushed rearwardly into said hole.

4. An adapter for mounting on a panel which has front and rear faces and a through hole, where said adapter includes a passthrough for extending substantially through said hole and a clip for holding said passthrough to said panel, characterized by:

said clip has an axis, a mount which is mounted on said passthrough, a washer extending around said axis for abutting said panel front face, a plurality of legs extending rearwardly from said washer and having rear ends for lying rearward of said panel rear face, and a plurality of latches having rear ends mounted on said rear ends of said legs and having front ends lying slightly rearward of said washer and being resiliently biased to a position far enough from said axis to abut said panel rear face but being resiliently deflectable toward said axis to enable said latches to pass through said hole when said pass through with said clip thereon is pushed rearwardly into said hole;

said passthrough has a rear location which lies within said rear ends of said legs and which supports said rear ends of said legs against radially inward deflection;

said passthrough has a recessed portion which lies forward of said rear location and which has an outside diameter that is less than the diameter of said rear location, said recessed portion lying radially within said front ends of said latches to receive said front ends of said latches when said adapter is pushed rearwardly into said through hole in said panel.

5. An adapter for mounting in a hole of a panel that has front and rear faces, comprising:

a passthrough which has an axis and which is elongated in an axial direction;

a molded plastic clip which is mounted on said passthrough, said clip having a front end with a radially outwardly projecting flange which forms a washer to substantially abut said front face of said panel;

said clip including a sleeve extending rearwardly from said washer and having a rear end that closely surrounds said passthrough, said sleeve having a plurality of bendable latches with free front latch ends lying slightly rearward of said washer and having directly forwardly-facing surfaces for abutting said panel rear face at locations spaced from the hole in the panel.

* * * * *